(12) United States Patent
Berge

(10) Patent No.: US 7,177,765 B1
(45) Date of Patent: Feb. 13, 2007

(54) METHOD OF GENERAL ELASTIC INVERSION BY COMBINATION OF CALCULATED PSEUDO-SHEAR AND MEASURED COMPRESSIONAL SEISMIC AMPLITUDE INFORMATION

(76) Inventor: Tim B. Berge, 519 Lynwood Dr., Anchorage, AK (US) 99518

( * ) Notice: Subject to any disclaimer, the term of this patent is extended or adjusted under 35 U.S.C. 154(b) by 74 days.

(21) Appl. No.: 11/062,716

(22) Filed: Feb. 21, 2005

(51) Int. Cl.
*G01V 1/28* (2006.01)
(52) U.S. Cl. .......................... 702/16; 702/13
(58) Field of Classification Search ................. 702/14, 702/18, 16; 367/75
See application file for complete search history.

(56) References Cited

U.S. PATENT DOCUMENTS

| | | | | |
|---|---|---|---|---|
| 4,831,530 A | * | 5/1989 | Rai | 702/12 |
| 4,858,202 A | * | 8/1989 | Fitch et al. | 367/75 |
| 4,964,096 A | * | 10/1990 | Ruckgaber | 367/70 |
| 5,583,825 A | * | 12/1996 | Carrazzone et al. | 367/31 |
| 6,091,669 A | * | 7/2000 | Chen | 367/37 |
| 6,374,186 B1 | * | 4/2002 | Dvorkin et al. | 702/18 |
| 6,473,696 B1 | * | 10/2002 | Onyia et al. | 702/6 |
| 6,546,339 B2 | * | 4/2003 | Bevc et al. | 702/18 |
| 6,611,764 B2 | * | 8/2003 | Zhang | 702/18 |
| 6,751,558 B2 | * | 6/2004 | Huffman et al. | 702/14 |
| 6,785,612 B1 | * | 8/2004 | Zhang | 702/14 |
| 7,027,354 B2 | * | 4/2006 | Cole et al. | 367/73 |

* cited by examiner

*Primary Examiner*—Donald McElheny, Jr.
(74) *Attorney, Agent, or Firm*—Edwin H. Crabtree; Ramon L. Pizarro

(57) ABSTRACT

A method designed to combine both pseudo compressional interval velocity and pseudo shear interval velocity from seismic data for predicting fluid type and porosity in oil and gas exploration. The first step is the generation of $\psi S$, pseudo shear reflectivity data, and P, pseudo compressional reflectivity data from the seismic data. The second step of the method is to produce scaled pseudo shear reflectivity $\psi Vs$ and scaled pseudo compressional reflectivity $\psi Vp$ from both the $\psi S$ and P data and then combine and re-project the $\psi Vs$ and the $\psi Vp$ data. The compression and shear reflectivity data are inverted, scaled to pseudo-velocity and then calibrated to well control. The resulting $\psi Vp$ and $\psi Vs$ volumes produce fluid volume and porosity volume. The fluid and porosity volumes can be stored in an electronic storage medium for analysis to distinguish between commercial and non-commercial gas accumulations prior to drilling.

20 Claims, 4 Drawing Sheets

METHOD OF GENERAL ELASTIC INVERSION BY COMBINATION OF CALCULATED PSEUDO-SHEAR AND MEASURED COMPRESSIONAL SEISMIC AMPLITUDE INFORMATION

BACKGROUND OF THE INVENTION (a) Field of the Invention

This invention relates to a general method of seismic elastic inversion and more particularly, but not by way of limitation, to a specific inversion method designed to combine compressional interval velocity from seismic data and pseudo shear interval velocity data for predicting fluid type and porosity.

(b) Discussion of Prior Art

In the exploration of oil and gas using seismic data, forward and inverse methods are used. A forward method is where conditions and experiment are known and the results are measured and repeatable. An inverse method is opposite of a forward method and has multiple solutions.

When using an inverse method, and more specifically the inversion method discussed herein, the end results and experiment are known and the original geological conditions are unknown and are to be solved. It is true that multiple solutions for different conditions can give rise to the same measurements. Also, it is possible to narrow the choice of the different measurements.

Most geological problems can in fact be analyzed using inverse procedures. Understanding the relationship of the inverse procedures is both simple and profound in seismic data study. Therefore, using an inverse method, as described herein, can be a fundamental reason for helping reduce risk and uncertainty in the study of geology and geophysics related to oil and gas exploration.

In the process of interpretation of seismic inversion data, it is essential to first recognize that inverse methods can have multiple solutions, as mentioned above, and then understand a range of possible variables in a forward method to evaluate an answer. In the subject inversion method, (which is a numerical method), seismic response is used to predict rock properties such as velocity, density, compressibility, porosity and water saturation. Heretofore, there have been many other and different inversion methods that also claim to be able to do this. The subject method differs from those other methods in that it is calibrated and as a result more accurate. It can be used to distinguish between non-commercial "Fizzgas" and commercial gas accumulations prior to drilling.

The subject inversion method is classified as a general elastic inversion method rather than an acoustic method, since it uses shear information. Also and unlike shape attribute methods, the inversion method can be calibrated, scaled to well control and the results are non-arbitrary.

SUMMARY OF THE INVENTION

In view of the foregoing, it is a primary objective of the subject invention to provide a unique and specific inversion method for predicting rock porosity and fluid type, such as water vs. gas in sediments. The new method can be used for both marine and land exploration with excellent predictive results.

Another object of the specific inversion method is to provide calibrated results from seismic data that is simple to understand with values that are non-arbitrary.

Yet another object of the inversion method is while good seismic data and high fold are preferred along with a good quality sonic curve from an area well used for calibration, this type of information is not necessarily required.

Still another object of invention is, because of it's simplicity in concept, the specific inversion method can be used as a general solution in replacing prior specific elastic inversion methods.

A further object of the inversion method is to provide a method that doesn't result in a linear transformation of compression amplitudes, which heretofore won't distinguish a separation of gas and water in a compression and shear crossplot domain. The subject method provides a rigorous "full Zoeppritz" solution involving ray-tracing. The ray-tracing provides a meaningful, non-linear calculation of what converted shear-wave amplitudes by offset would have been had they been recorded. In essence, the shear wave AVO is modeled.

Broadly, the subject seismic elastic inversion method includes at least two key steps for proper execution and for good seismic data results. The first step is the generation of $\psi S$, pseudo shear reflectivity data, and P, compressional reflectivity data. The compressional reflectivity is measured during conventional seismic acquisition and is also generally referred to as a seismic gather, or pre-stack CDP gather. Likewise, generation of the $\psi S$, the shear reflectivity data, is done in the pre-stack domain. The object is to estimate converted wave shear amplitudes at different offset angles.

The second step of the method is produce both scaled pseudo shear velocity ($\psi Vs$) and scaled pseudo compressional velocity ($\psi Vp$) from both the $\psi S$ and P reflectivity data, and then to combine and re-project the $\psi Vs$ and the $\psi Vp$ data to produce a general elastic inversion or GEI dataset. To do this, the compression and shear reflectivity data are inverted, scaled to pseudo-velocity and then calibrated to well control. The resulting $\psi Vp$ and $\psi Vs$ volumes are combined and re-projected to produce a GEI fluid volume and a porosity volume.

These and other objects of the present invention will become apparent to those familiar with processing geological and seismic data for oil and gas exploration when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DETAILED DESCRIPTION OF THE PREFERRED EMBODIMENTS

Figure 1:
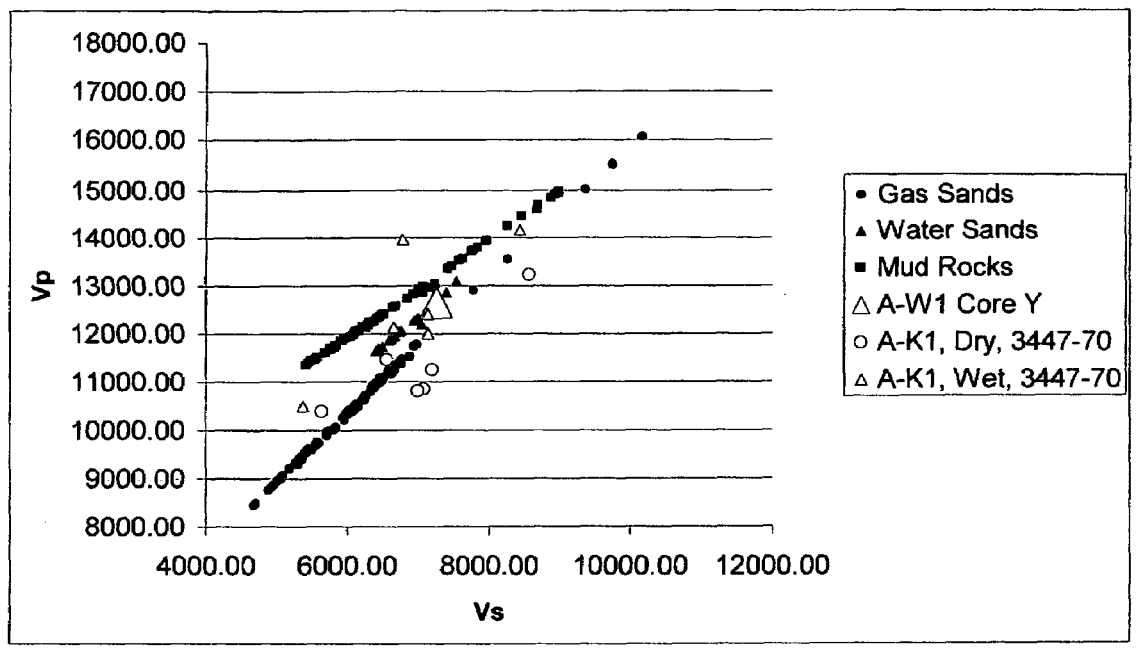
FIG. 1 is a Vp/Vs crossplot from wells in the Ibhubesi Field, offshore of the West Coast of the Republic of South Africa, and showing different classes of lithology, such as gas sands, water sands and mud rocks.

In FIG. 1, an example of a crossplot of dipole sonic data Vp and Vs volumes is illustrated. The data is from a plurality of gas wells in the Ibhubesi Gas Field, offshore from the West Coast of the Republic of South Africa In this crossplot, the Vp and Vs relationship from a number of data sources from several of the Ibhubesi wells are shown. This information includes dipole sonic data, whole core analysis, and dipole measurements made on both dry and water-saturated sidewall core. From viewing this crossplot, three trends can be clearly seen again. The lithology is shown for gas interval, water sands and mud rocks. Also, porosity lines are shown to correspond with sand porosities.

Figure 2:
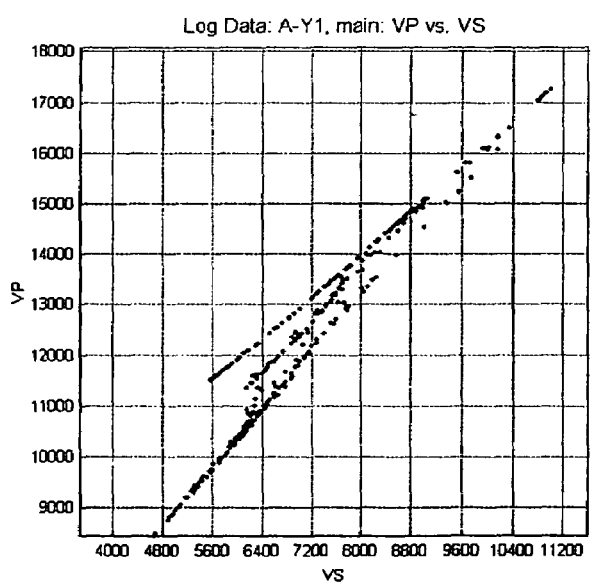
FIG. 2 is a Vp/Vs crossplot from a productive gas well with a single wet SS.

In FIG. 2, a Vp/Vs crossplot of a single producing gas well is shown. In this crossplot of the single well, three distinct trends can be seen, which are similar to the treads of the gas field shown in FIG. 1. The trends correspond to mud rocks, water sands and gas sands. The trends in the two crossplots run from the lower left of the diagram upwardly toward the upper right. The depth interval is from 3100 meters to 3500 meters and the reservoir gross interval is about 70 meters in thickness in both of the crossplots.

Figure 3:
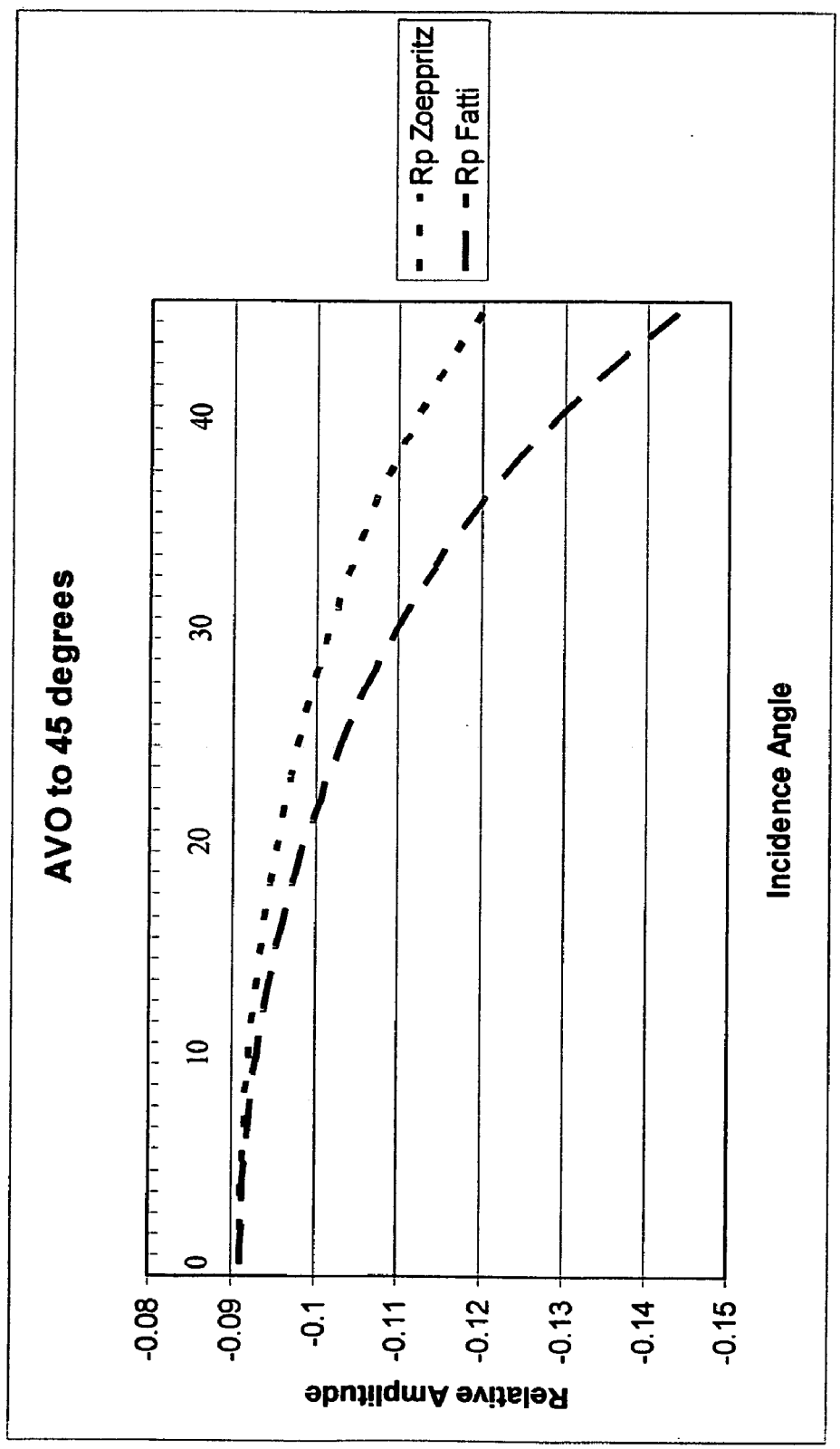
FIG. 3 illustrates P-wave amplitudes of a porous type 2 water sand using Zoeppritz and Fatti AVO calculations.
Figure 4:
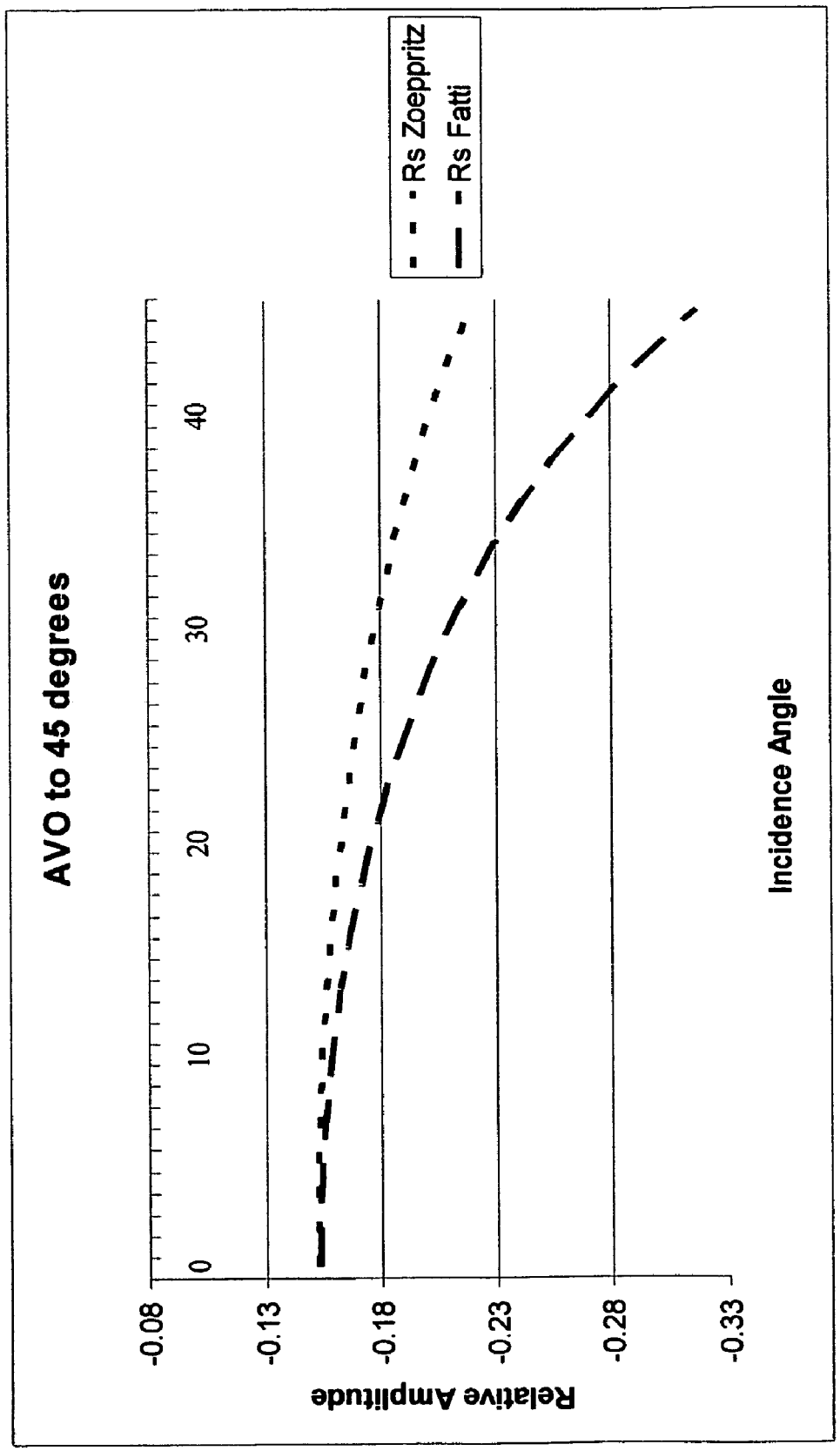
FIG. 4 illustrates P-wave amplitudes of a porous type 3 gas sand using Zoeppritz and Fatti AVO calculations

In FIGS. 3 and 4, a dilemma using a Zoeppritz estimate is illustrated to model AVO in an attempt to predict gas content. In FIG. 3, P-wave amplitudes of a porous type 2 water sand using Zoeppritz and Fatti AVO calculations are shown. In FIG. 4, P-wave amplitudes of a porous type 3 gas sand using Zoeppritz and Fatti AVO calculations are illustrated.

In these two examples, a reflected P AVO, calculated using a Zoeppritz solution, is plotted for the two examples using real well data with a porous water-bearing interval in a type 2 water sand compared with a type 3 gas sand. It should be note that the difference between the two curves shown in FIG. 3 is nearly the same as the difference between the two curves shown in FIG. 4 where the wet sand is normalized to the less porous gas sand. The importance of this comparison indicates the use of AVO for fluid discrimination is severely degraded when approximations are used. Further comparison of the two examples shows there is progressively more mode conversion to shear modes and more mode conversion at lower angles of incidence in the gas sand example.

It should be mentioned that a critical issue, since the P reflection amplitude is directly measured, is how the S reflectivity volume is produced. As mentioned above, one common source of error is many prior art methods result in only a linear transformation of the P-wave amplitudes, which will not produce a separation of gas and water cases in the P and S crossplot domain. The use of approximations, as shown in FIGS. 3 and 4, of the portioning phenomena such as the Shuey or the Fatti approximations, while acceptable at small offsets, are increasingly erroneous with offset. The error is even greater for a gas case. Therefore, the subject general elastic inversion method is used with a rigorous full Zoeppritz solution.

The Zoeppritz equations can be solved to calculate the amplitude values of the reflected and transmitted wave modes that result when a P-wave hits an acoustic interface. Since there are two modes (Shear and Compresional) and both reflection and transmission of both modes at the interface, the four equations have four unknowns. These unknowns are the reflected P and S amplitude and the transmitted P and S amplitude. Of interest is the reflected P and S amplitudes for calculating the reflected SAVO (amplitude versus offset). Following are four equations with four unknowns. There are other formulations of the Zoeppritz equations, but when shown in this form their solution is direct. These four equations correspond to equations 4.26a, 4.26b, 4.26c and 4.26d in Telford, Geldart, Sheriff and Keys, 1976.

The equations all have a from: constant*A1+−constant*A2+− . . . . Constant*An=constant (once the P & S velocities, densities and Snell's Law values; incident, reflected and transmitted, are known) where An is a resultant wave amplitude value. To better estimate pseudo-shear values for a full solution the equations are:

Zoeppritz Equations $A_1 \cos \Phi_1 - B_1 \sin \lambda_1 + A_2 \cos \Phi_2 + B_2 \sin \lambda_2 = A_0 \cos \Phi_1$ $A_1 \sin \Phi_1 + B_1 \cos \lambda_1 - A_2 \sin \Phi_2 + B_2 \cos \lambda_2 = -A_0 \cos \Phi_1$ $A_1 Z_1 \cos 2\lambda_1 - B_1 W_1 \sin 2\lambda_1 - A_2 Z_2 \cos 2\lambda_2 - B_2 W_2 \sin 2\lambda_2 = A_0 Z_1 \cos 2\lambda_1$ $A_1 Y_1 W_1 \sin 2\Phi_1 + B_1 W_1 \cos 2\lambda_1 + A_2 Y_2 W_2 \sin 2\lambda_2 - B_2 W_2 \cos 2\lambda_2 = A_0 Y_1 W_1 \sin 2\Phi_1$ Eqs. 1a,1b,1c, and 1d (From Telford, Geldart, Sheriff, and Keys, 1976, eqs. 4.26a, 4.26b, 4.26c, and 4.26d)

The solution of simultaneous equations with multiple unknowns involves a matrix calculation that is described by the theorem known as "Cramer's Rule". This rule states: "If the determinate D of the coefficients in a system of n linear equations in n unknowns is not zero, then the equations have a unique solution. In the solution, each unknown may be expressed as a fraction of two determinants with denominator column of coefficients of the unknown in question by the constants $c1, c2, \ldots, cn$." (Thomas, George, "Calculus and Analytic Geometsry", 1972). Therefore, the four above Zoeppritz equations can be solved by inversion and multiplication of the following determinant matrix and coefficient matrix. The two matrices are:

| Determinants | | | | | Coefficients | |
|---|---|---|---|---|---|---|
| $\cos\theta_1$ | $-\sin\lambda_1$ | $\cos\theta_2$ | $\sin\lambda_2$ | = M | $A_0\cos\theta_1$ | = N |
| $\sin\theta_1$ | $\cos\lambda_1$ | $-\sin\theta_2$ | $\cos\lambda_2$ | | $-A_0\sin\theta_1$ | |
| $Z_1\cos2\lambda_1$ | $-W_1\sin2\lambda_1$ | $-Z_2\cos2\lambda_2$ | $-W_2\sin2\lambda_2$ | | $-A_0Z_1\cos2\lambda_1$ | |
| $\gamma_1W_1\sin2\theta_1$ | $W_1\cos2\lambda_1$ | $Y_2W_2\sin2\theta_2$ | $-W_2\cos2\lambda_2$ | | $A_0\gamma_1W_1\sin2\theta_1$ | |

Calculation of the four converted wave amplitude values, assuming Snell's calculations have been performed, would involve first inversion of the determinant matrix and then matrix multiplication of the inverted and coefficient matrices. The solution would then be:

$An = M^{-1} N$

The above equation is similar to equation 5.38, page 144, Aki and Richards, though the matrices M and N are quite different.

The following four equations of a Zoeppritz solution for 1 incidence angle is:

| A1 = | | | | | B1 = | | |
|---|---|---|---|---|---|---|---|
| $A_0\cos\theta_1$ | $-\sin\lambda_1$ | $\cos\theta_2$ | $\sin\lambda_2$ | $\cos\theta_1$ | $A_0\cos\theta_1$ | $\cos\theta_2$ | $\sin\lambda_2$ |
| $-A_0\sin\theta_1$ | $\cos\lambda_1$ | $-\sin\theta_2$ | $\cos\lambda_2$ | $\sin\theta_1$ | $-A_0\sin\theta_1$ | $-\sin\theta_2$ | $\cos\lambda_2$ |
| $-A_0Z_1\cos2\lambda_1$ | $-W_1\sin2\lambda_1$ | $-Z_2\cos2\lambda_2$ | $-W_2\sin2\lambda_2$ | $Z_1\cos2\lambda_1$ | $-A_0Z_1\cos2\lambda_1$ | $-Z_2\cos2\lambda_2$ | $-W_2\sin2\lambda_2$ |
| $A_0\gamma_1W_1\sin2\theta_1$ | $W_1\cos2\lambda_1$ | $\gamma_2W_2\sin2\theta_2$ | $-W_2\cos2\lambda_2$ | $A_1W_1\sin2\lambda_1$ | $A_0\gamma_1W_1\sin2\gamma1$ | $\gamma_2W_2\sin2\theta_2$ | $-W_2\cos2\lambda_2$ |
| $\cos\theta_1$ | $-\sin\lambda_1$ | $\cos\theta_2$ | $\sin\lambda_2$ | $\cos\theta_1$ | $-\sin\lambda_1$ | $\cos\theta_2$ | $\sin\lambda_2$ |
| $\sin\theta_1$ | $\cos\lambda_1$ | $-\sin\theta_2$ | $\cos\lambda_2$ | $\sin\theta_1$ | $\cos\lambda_1$ | $-\sin\theta_2$ | $\cos\lambda_2$ |
| $Z_1\cos2\lambda_1$ | $-W_1\sin2\lambda_1$ | $-Z_2\cos2\lambda_2$ | $-W_2\sin2\lambda_2$ | $Z_1\cos2\lambda_1$ | $-W_1\sin2\lambda_1$ | $-Z_2\cos2\lambda_2$ | $-W_2\sin2\lambda_2$ |
| $\gamma_1W_1\sin2\theta_1$ | $W_1\cos2\lambda_1$ | $\gamma_2W_2\sin2\theta_2$ | $-W_2\cos2\lambda_2$ | $\gamma_1W_1\sin2\theta_1$ | $W_1\cos2\lambda_1$ | $\gamma_2W_2\sin2\theta_2$ | $-W_2\cos2\lambda_2$ |

| A2 = | | | | | B2 = | | |
|---|---|---|---|---|---|---|---|
| $\cos\theta_1$ | $-\sin\lambda_1$ | $A_0\cos\theta_1$ | $\sin\lambda_2$ | $\cos\theta_1$ | $-\sin\lambda_1$ | $\cos\theta_2$ | $A_0\cos\theta_1$ |
| $\sin\theta_1$ | $\cos\lambda_1$ | $-A_0\sin\theta_1$ | $\cos\lambda_2$ | $\sin\theta_1$ | $\cos\lambda_1$ | $-\sin\theta_2$ | $-A_0\sin\theta_1$ |
| $Z_1\cos2\lambda_1$ | $-W_1\sin2\lambda_1$ | $-A_0Z_1\cos2\lambda_1$ | $-W2\sin2\lambda_2$ | $Z_1\cos2\lambda_1$ | $-W_1\sin2\lambda_1$ | $-Z_2\cos2\lambda_2$ | $-A_0Z_1\cos2\lambda_1$ |
| $\gamma_1W_1\sin2\theta_1$ | $W_1\cos2\lambda_1$ | $A_0\lambda_1W_1\sin2\theta_1$ | $-W2\cos2\lambda_2$ | $\gamma_1W_1\sin2\theta_1$ | $W_1\cos2\lambda_1$ | $\gamma_2W_2\sin2\theta_2$ | $A_0\gamma_1W_1\sin2\theta_1$ |
| $\cos\theta_1$ | $-\sin\lambda_1$ | $\cos\theta_2$ | $\sin\lambda_2$ | $\cos\theta_1$ | $-\sin\lambda_1$ | $\cos\theta_2$ | $\sin\lambda_2$ |
| $\sin\theta_1$ | $\cos\lambda_1$ | $-\sin\theta_2$ | $\cos\lambda_2$ | $\sin\theta_1$ | $\cos\lambda_1$ | $-\sin\theta_2$ | $\cos\lambda_2$ |
| $Z_1\cos2\lambda_1$ | $-W_1\sin2\lambda_1$ | $-Z_2\cos2\lambda_2$ | $-W_2\sin2\lambda_2$ | $Z_1\cos2\lambda_1$ | $-W_1\sin2\lambda_1$ | $-Z_2\cos2\lambda_2$ | $-W_2\sin2\lambda_2$ |
| $\gamma_1W_1\sin2\theta_1$ | $W_1\cos2\lambda_1$ | $\gamma_2W_2\sin2\theta_2$ | $-W_2\cos2\lambda_2$ | $\gamma_1W_1\sin2\theta_1$ | $W_1\cos2\lambda_1$ | $\gamma_2W_2\sin2\theta_2$ | $-W_2\cos2\lambda_2$ |

The above four equations are the complete single-formula, albeit matrix, solutions for amplitude as a function of offset for four resultant waveforms. The first two equations are used for the reflected modes. The top or first equation, which is the equation for the reflected P-wave amplitude as a function of incidence angle, has been expressed many times as an approximation. But, unlike the Shuey, Fatti and like equations, the first equation is not an approximation. There are no implicit errors as there are with approximations. Also, the calculations are stable at long offsets. It has been found that errors, due to approximations, are not acceptable if one is to attempt fluid and gas recognition. In applications where the P-wave AVO is modeled and calculated, the first equation is a better one to use.

The second equation or the equation second from the top is the reflected S-wave amplitude as a function of offset. It is a shear-realm equivalent to Shuey's or Fatti's equations, but again is an estimate. This equation can be used to calculate pseudo-shear gathers. Also, it can be used with any other application where S-wave reflectivity is calculated.

The next to last equation is a transmitted P-wave amplitude as a function of offset. The last equation is a transmitted S-wave amplitude as a function of offset. It should be mentioned that heretofore the use of the Zoepperitz equations have not be used in this manner to provide the unique results provided by the subject elastic inversion method.

Once the P-impedance and the Pseudo-S impedance volumes have been calculated, they are scaled for interval velocity by well tie. The volumes can then be combined in a number of ways to calculate elastic attributes. The calculations are:

Calculation of Elastic Parameters

| | |
|---|---|
| K = Bulk Modulus | $K = \rho(Vp^2 - (4/3) \cdot Vs^2)$ |
| μ = Shear Modulus 'Mu' | $\mu = \rho Vs^2$ |
| λ = Lame's Coefficient 'Lamda' | $\lambda = \rho Vp^2 - (2/3)\rho Vs^2$ |

-continued

| | |
|---|---|
| E = Young's Modulus | $E = 2\rho Vs^2(1 - (Vp^2 - 2Vs^2)/2(Vp^2 - Vs^2))$ |
| ν = Poisson's Ratio | $\nu = (Vp^2 - 2Vs^2)/2(Vp^2 - Vs^2)$ |

Where ρ = density, 'Rho', Vp = P-wave velocity and, Vs = Shear Wave Velocity

Since all of the elastic parameters involve a scaling of Vp and Vs, this relationship is used directly and the data re-projected in a way that meaningfully is separated into different classes, as seen on the crossplots.

Figure 5:
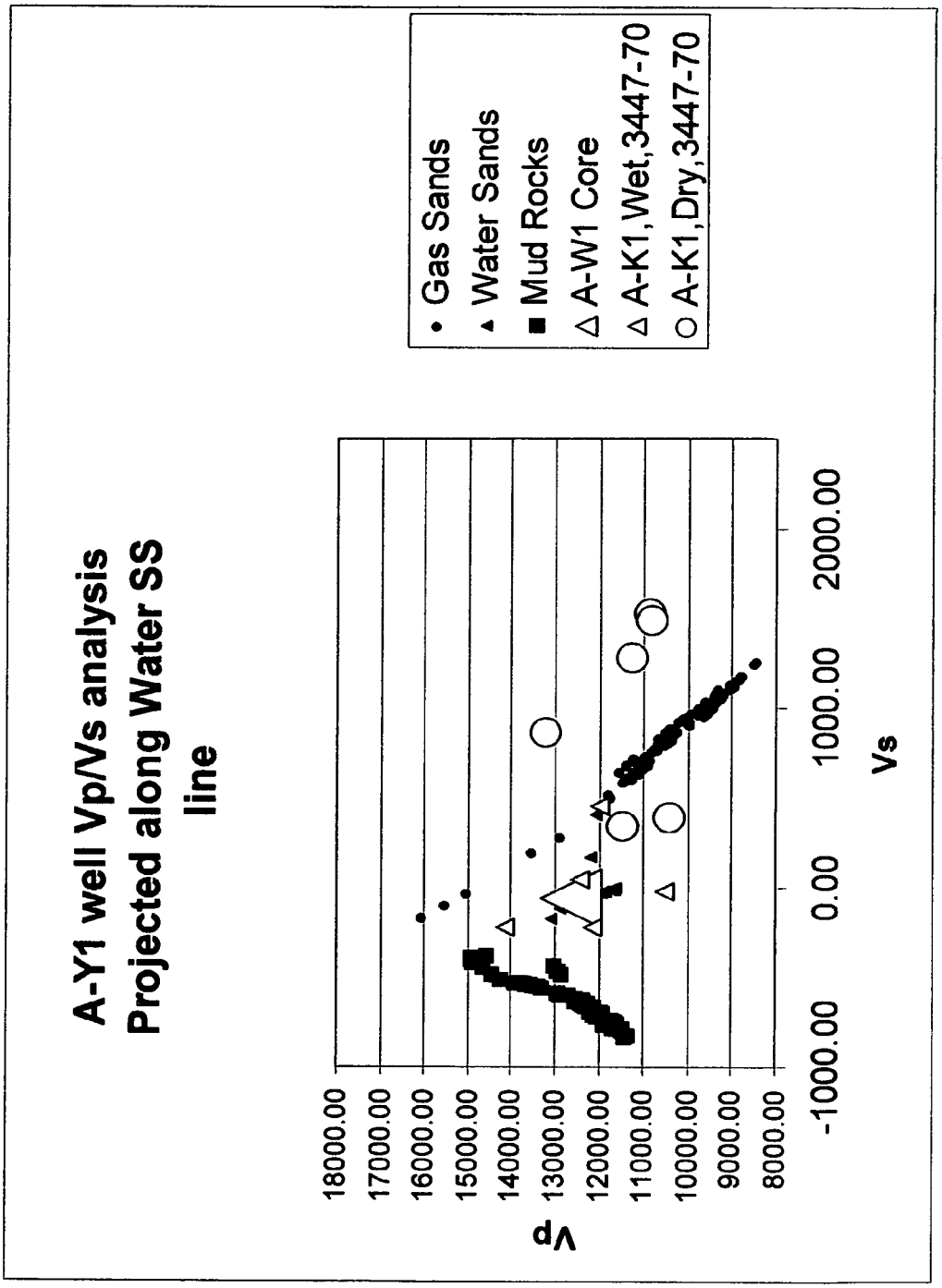
FIG. 5 is a re-projection of the Vp/Vs crossplot well data and along a water line trend.

In FIG. 5, a re-projection of the Vp/Vs crossplot well data along a water line trend is shown. By determining the slope of any of the three lines shown in FIG. 5, the data can be projected along a selected line. In this example and for this area, the data was projected along the trend of a water line. In Simms, Kemper and Deo, 2003, the projection of this type of well data is shown.

From the re-projection of well data as shown in FIG. 6, it is evident that if this can be done with seismic data, then is possible to project the seismic data in the same way along a water line to produce a fluid volume along with projection in an orthogonal direction to the trend and produce a porosity volume. Furthermore, the volumes can be specifically calibrated to the scales of each axis with the fluid volume calibrated to values on an x-axis and the porosity volume calibrated to values on a y-axis. This can be done with the seismic P reflectivity and S reflectivity data volumes in the following steps. The first step being to a simple recursive inversion of both volumes to produce P impedance and S impedence volumes. The second step is to re-scale both volumes to a range of interval velocity values seen in the wells and to the specific values mapped at control points. Since density trends in the same direction in a crossplot domain as the projection trend, it need not be considered. These steps produce the ψVp and ψVs volumes with values representing true scaled interval Vp and Vs similar to values found in the wells used for calibration.

The next step or third step is to combine the ψVp and ψVs seismic data, which are now scaled and calibrated, by applying the same formula used to project the well Vp and Vs data. The porosity volume can now be calculated in a similar way by using the orthogonal formula. This produces two scaled and calibrated volumes. One of the scaled and calibrated volumes can be used to map fluids and lithology type. The other volume used to determine rock porosity.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A seismic elastic inversion method for predicting rock porosity and fluid type in sediments having water and gas therein, the inversion method using seismic data from an oil and gas exploration area of interest, the method steps comprising:
   generating ψS pseudo shear reflectivity data and P compressional reflectivity data from the seismic data using conventional seismic techniques;
   calculating and producing scaled pseudo shear and compressional velocity data ψVs and ψVp from both the ψS pseudo shear reflectivity data and the P compressional reflectivity data;
   combining and re-projecting the velocity data ψVs and ψVp and inverting the velocity data ψVs and ψVp and then calibrating the velocity data to well control for producing a fluid volume and a porosity volume of the oil and gas exploration area; and
   storing the fluid and porosity volume in an electronic storage medium for analysis to distinguish between commercial and non-commercial gas accumulations prior to drilling.

2. The method as described in claim 1 wherein the step of generating the ψS pseudo shear reflectivity data and P compressional reflectivity data is done in a pre-stack domain for estimating converted wave shear amplitudes at different offset angles.

3. The method as described in claim 2 wherein estimating converted wave shear amplitudes at different shear angles is calculated using at least one Zoeppritz equations.

4. The method as described in claim 2 wherein estimating converted wave shear amplitudes at different shear angles is calculated using a plurality of Zoeppritz equations and having multiple unknowns.

5. The method as described in claim 4 wherein the plurality of Zoeppritz equations with multiple unknowns includes a matrix calculation using a theorem known as Cramer's Rule.

6. The method as described in claim 1 further including a step of combining the fluid volume and the porosity volume for calculating elastic parameters.

7. The method as described in claim 6 further including a step of re-projecting the elastic parameters of the fluid volume and the porosity volume onto a crossplot domain for differentiating classes of lithology, such as oil and gas producing sands, water sands and the like.

8. A seismic elastic inversion method for predicting rock porosity and fluid type in sediments having water and gas therein, the inversion method using seismic data from an oil and gas exploration area of interest, the method steps comprising:
   generating ψS pseudo shear reflectivity data and P compressional reflectivity data in a pre-stack domain from the seismic data using conventional seismic techniques;
   estimating converted wave shear amplitudes at different offset angles;
   calculating and producing scaled pseudo velocity data ψVs and ψVp from both the ψS pseudo shear reflectivity data and the P compressional reflectivity data;
   combining and re-projecting the velocity data ψVs and ψVp and inverting the velocity data ψVs and ψVp and calibrating the velocity data to well control for producing a fluid volume and a porosity volume of the oil and gas exploration area; and
   storing the fluid and porosity volume in an electronic storage medium for analysis to distinguish between commercial and non-commercial gas accumulations prior to drilling.

9. The method as described in claim 8 wherein the step of estimating the converted wave shear amplitudes at different shear angles is calculated using a plurality of Zoeppritz equations and having multiple unknowns.

10. The method as described in claim 9 wherein the Zoeppritz equations with multiple unknowns includes a matrix calculation using a theorem known as Cramer's Rule.

11. The method as described in claim 9 wherein one of the Zoeppritz equations is used to determine reflective P-wave amplitude as a function of incidence angle, the calculation stable at long offsets.

12. The method as described in claim 9 wherein one of the Zoeppritz equations is used to determine reflective S-wave amplitude as a function of offset, the calculation used to calculate pseudo-shear gathers.

13. The method as described in claim 9 wherein one of the Zoeppritz equations is used to determine transmitted P-wave amplitude as a function of offset.

14. The method as described in claim 9 wherein one of the Zoeppritz equations is used to determine transmitted S-wave amplitude as a function of offset.

15. A seismic elastic inversion method for predicting rock porosity and fluid type in sediments having water and gas therein, the inversion method using seismic data from an oil and gas exploration area of interest, the method steps comprising:
   generating ψS pseudo shear reflectivity data and P compressional reflectivity data in a pre-stack domain and from the seismic data using conventional seismic techniques;
   estimating converted wave shear amplitudes at different offset shear angles using a plurality of Zoeppritz equations with multiple unknowns;
   calculating and producing scaled pseudo velocity data ψVs and ψVp from both the ψVS pseudo shear reflectivity data and the P compressional reflectivity data;
   combining and re-projecting the velocity data ψVs and ψVp and inverting the velocity data ψVs and ψVp and calibrating the data to well control for producing a fluid volume and a porosity volume;
   combining the fluid volume and the porosity volume for calculating elastic parameters;
   re-projecting the elastic parameters of the fluid volume and the porosity volume of the oil and gas exploration area onto a crossplot domain for differentiating classes of lithology, such as oil and gas producing sands, water sands and the like; and storing the fluid and porosity volume in an electronic storage medium for analysis to distinguish between commercial and non-commercial gas accumulations prior to drilling.

16. The method as described in claim 15 wherein the Zoeppritz equations with multiple unknowns includes a determinate matrix calculation and a coefficient matrix calculation using a theorem known as Cramer's Rule.

17. The method as described in claim 15 wherein one of the Zoeppritz equations is used to determine reflective P-wave amplitude as a function of incidence angle, the calculation stable at long offsets.

18. The method as described in claim 15 wherein one of the Zoeppritz equations is used to determine reflective S-wave amplitude as a function of offset, the calculation used to calculate pseudo-shear gathers.

19. The method as described in claim 15 wherein one of the Zoeppritz equations is used to determine transmitted P-wave amplitude as a function of offset.

20. The method as described in claim 15 wherein one of the Zoeppritz equations is used to determine transmitted S-wave amplitude as a function of offset.

* * * * *